(12) United States Patent  
Downey et al.

(10) Patent No.: US 11,047,104 B2  
(45) Date of Patent: Jun. 29, 2021

(54) LOAD BEARING CLAMP FOR TRANSMITTING LOADS TO A SHAFT

(71) Applicant: Hubbell Incorporated, Shelton, CT (US)

(72) Inventors: Shawn David Downey, Columbia, MO (US); Timothy Michael Kemp, Columbia, MO (US)

(73) Assignee: Hubbell Incorporated, Shelton, CT (US)

( * ) Notice: Subject to any disclaimer, the term of this patent is extended or adjusted under 35 U.S.C. 154(b) by 690 days.

(21) Appl. No.: 15/621,204

(22) Filed: Jun. 13, 2017

(65) Prior Publication Data

US 2017/0356570 A1    Dec. 14, 2017

Related U.S. Application Data

(60) Provisional application No. 62/349,335, filed on Jun. 13, 2016.

(51) Int. Cl.
*E02D 27/12* (2006.01)
*E02D 7/22* (2006.01)
*F16B 2/06* (2006.01)

(52) U.S. Cl.
CPC .............. *E02D 27/12* (2013.01); *E02D 7/22* (2013.01); *F16B 2/065* (2013.01); *Y10T 403/7067* (2015.01)

(58) Field of Classification Search
CPC . E02D 7/22; E02D 27/12; F16B 2/065; F16B 2200/506; F16B 2200/509;

(Continued)

(56) References Cited

U.S. PATENT DOCUMENTS 155,121 A * 9/1874 Stuart ................... F16D 1/0864  
                                          403/312  
1,247,437 A * 11/1917 MchLaughlin ......... F16B 2/065  
                                          24/569

(Continued)

FOREIGN PATENT DOCUMENTS

EP         567821 A1 * 11/1993 ........... F16D 1/0864  
FR        2746437 A1 * 9/1997 ........... F16D 1/0864

(Continued)

OTHER PUBLICATIONS

Helical Pulldown Micropile Flyer, Hubbell Incorporated, Mar. 2006, (8 pages).

(Continued)

*Primary Examiner* — Josh Skroupa  
(74) *Attorney, Agent, or Firm* — Wissing Miller LLP (57) ABSTRACT

The present disclosure provides a load bearing clamp including a first clamp member, the first clamp member including a first semi-annular clamping surface, a second clamp member, the second clamp member including a second semi-annular clamping surface, the second semi-annular clamping surface opposing the first semi-annular clamping surface and at least one member for drawing the first clamp member and the second clamp member toward each other, wherein at least one of the first semi-annular clamp surface and the second semi-annular clamp surface includes at least one irregular surface that deforms at least a portion of a shaft clamped between the first and second clamp members.

24 Claims, 7 Drawing Sheets

(58) Field of Classification Search
CPC .. F16D 1/0864; F16L 3/1016; Y10T 403/645; Y10T 403/648; Y10T 403/7062; Y10T 403/7067; Y10T 403/7188
USPC ............. 403/337, 338, 373, 374.3, 399
See application file for complete search history.

(56) References Cited

U.S. PATENT DOCUMENTS

| | | | |
|---|---|---|---|
| 2,733,624 A | 2/1956 | Dowidat | |
| 3,005,356 A * | 10/1961 | Gandrud | F16D 1/0864 403/373 |
| 3,260,542 A * | 7/1966 | Di Milla | F16D 1/0864 403/356 |
| 3,606,218 A * | 9/1971 | Enlund et al. | F16L 3/1091 248/74.2 |
| 4,019,824 A * | 4/1977 | Percy | F16D 1/0864 403/261 |
| 4,033,701 A * | 7/1977 | Labyer | F04B 53/144 403/338 |
| 4,068,445 A | 1/1978 | Bobbitt | |
| 4,688,446 A * | 8/1987 | Ishikawa | F16C 9/04 403/337 |
| 5,011,336 A | 4/1991 | Hamilton et al. | |
| 5,139,368 A | 8/1992 | Hamilton et al. | |
| 5,171,107 A | 12/1992 | Hamilton et al. | |
| 5,941,653 A * | 8/1999 | Cipriani | B60M 1/20 403/373 |
| 6,164,604 A * | 12/2000 | Cirino | F16L 3/04 248/74.3 |
| 6,527,233 B2 | 3/2003 | Maurice | |
| 6,618,905 B2 * | 9/2003 | Warashina | A01D 34/90 403/373 |
| 6,779,943 B2 * | 8/2004 | Shoen | F16L 35/00 403/373 |
| 7,179,010 B2 * | 2/2007 | Weger | F16L 3/243 403/399 |
| 8,109,057 B2 | 2/2012 | Stark | |
| 8,276,854 B2 * | 10/2012 | Mominee | F16L 3/1016 248/62 |
| 8,312,616 B2 | 11/2012 | Dole et al. | |
| 8,511,021 B2 | 8/2013 | Salisbury et al. | |
| 8,562,238 B2 * | 10/2013 | Hasei | A01D 34/90 403/234 |
| 2003/0063948 A1 * | 4/2003 | Liu | F16B 2/065 403/344 |
| 2012/0102685 A1 | 5/2012 | Keller | |

FOREIGN PATENT DOCUMENTS

| | | | | |
|---|---|---|---|---|
| GB | 1046938 A | * | 10/1966 | ......... F16D 1/0864 |
| GB | 2226869 A | * | 7/1990 | ......... F16D 1/0864 |

OTHER PUBLICATIONS

Hubbell Brochure "Encyclopedia of Anchoring:Power Installed Foundations, Guy Anchors and Installing Equipment. Tower support method that saves days and dollars." 2004 (10 pages).
A.B. Chance Co, Foundation Catalog "Power Installed Foundations", 2 pages, Jan. 15, 1969.
International Search Report and Written Opinion mailed in corresponding application PCT/US2017/037153 dated Oct. 23, 2017 (10 pages).

* cited by examiner

LOAD BEARING CLAMP FOR TRANSMITTING LOADS TO A SHAFT

CROSS REFERENCE TO RELATED APPLICATIONS

The present application is based on and claims benefit from U.S. Provisional Application Ser. No. 62/349,335 filed Jun. 13, 2016 entitled "Load Bearing Clamp for Transmitting Loads to a Shaft" the entire contents of which are herein incorporated by reference.

BACKGROUND

Field

The present disclosure relates generally to clamps, and more particularly to load bearing clamps for transmitting loads to a shaft.

Description of the Related Art

Deep foundations are used to support structures, such as buildings, towers, etc., when the soil underlying the structure would be too weak alone to support the structure. To effectively support a structure, a deep foundation has to penetrate the soil to a depth where competent load-bearing stratum is found. Conventional deep foundations such as a drilled shaft or a driven pile require large specialized equipment to install These approaches are cumbersome and expensive.

Helical or screw piles are a cost-effective alternative to conventional deep foundations because of the speed and ease at which a helical pile can be installed as well as requiring smaller more maneuverable installation equipment. Helical piles are rotated such that load bearing helical plates at the lower end of the pile effectively screw the pile into the soil to a desired depth. It can be difficult to connect a self-support tower to one or more helical piles such that the loads from the tower, both tension and compression can be transferred to the piles. This challenge can be exacerbated depending on the location of the tower. For example, often the towers are located in remote sites with limited access, making regular construction methods and equipment unavailable. Helical piles are installed to a specific torque to ensure adequate bearing capacity. Accordingly, the termination depth is generally unknown prior to installation. Generally, the pile is cut to the required elevation after installation. The pile can then be field drilled to connect an adapter utilizing nuts and bolts or other appropriate hardware. Alternatively, an adapter may be field welded to the pile. However, these methods are not easily accomplished in remote areas. For example, the quality of a field weld can be highly variable. In addition, often the pile will have a hot dip galvanized coating to protect the pile from corrosion. Utilizing the above-described methods, the hot dip galvanizing used for corrosion protection of the pile can be easily compromised.

SUMMARY

In one embodiment, a load bearing clamp according to the present disclosure may include a first clamp member, the first clamp member comprising a first semi-annular clamping surface, a second clamp member, the second clamp member comprising a second semi-annular clamping surface, the second semi-annular clamping surface opposing the first semi-annular clamping surface and at least one member for drawing the first clamp member and the second clamp member toward each other, wherein at least one of the first semi-annular clamp surface and the second semi-annular clamp surface includes at least one irregular surface that deforms at least a portion of a shaft clamped between the first and second clamp members.

In another embodiment, a load bearing clamp according to the present disclosure may include two opposed clamping members each having semi-annular clamping surfaces including at least one irregular surface that deforms at least a portion of a shaft clamped between the opposed clamping members.

In another embodiment, a grillage (a framework of crossing beams used for spreading loads over large areas) for attachment to piles according to the present disclosure may include a load bearing plate, a base supporting the load bearing plate and at least one hollow member extending from the base, the at least one hollow member for receiving a pile to which the grillage is to be attached.

In another embodiment, a grillage system for attachment to piles according to the present disclosure may include a load bearing plate, at least one hollow member extending from the load bearing plate, the at least one hollow member for receiving a pile shaft to which the grillage is to be attached and a load bearing clamp capable of being attached to the pile shaft for supporting the at least one hollow member, the load bearing clamp providing friction and mechanical connection to the pile shaft and transferring loads from the load bearing plate to the pile.

In another embodiment, a grillage system for attachment to piles according to the present disclosure may include a load bearing plate and a load bearing clamp capable of being attached to a pile shaft for supporting the load bearing plate, the load bearing clamp providing friction and mechanical connection to the pile shaft and transferring loads from the load bearing plate to the pile.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

An illustrative embodiment of the present disclosure provides a load bearing clamp that can be connected to a solid or hollow shaft at any point along its axis by clamping the load bearing clamp to the shaft utilizing tensioning members such as bolts and nuts. The load bearing clamp crimps and deforms the shaft providing both a friction and mechanical connection to the shaft. The tensioning bolts used on the load bearing clamp may be tensioned using, for example, a hydraulic or pneumatic driver. According to embodiments of the present disclosure, the load bearing clamp and tensioning nuts and bolts may be steel, e.g., Grade 8 steel, galvanized steel, stainless steel, or any other suitable alloy.

According to an illustrative embodiment of the present disclosure, the load bearing clamp may be utilized on a pile shaft for transferring axial loads to the pile shaft. The load bearing clamp can be connected to both hollow and solid pipe shaft piles having various shapes including round, square, etc. According to an illustrative embodiment of the present disclosure, the load bearing clamps can be utilized as a bearing plate in a concrete pile cap or can provide a bolting surface for a steel grillage. According to an illustrative embodiment of the present disclosure, the load bearing clamp can be used to transmit both tension and compression loads to a pile without having to weld or drill in the field.

According to an illustrative embodiment of the present disclosure, a grillage may be attached to one or more piles utilizing load bearing clamps such that axial loads are effectively and efficiently transferred from the grillage to the load bearing clamps and to the one or more piles. According to an illustrative embodiment, this can be performed without damaging any corrosion protection that may be provided on the piles and/or grillage.

Figure 1:
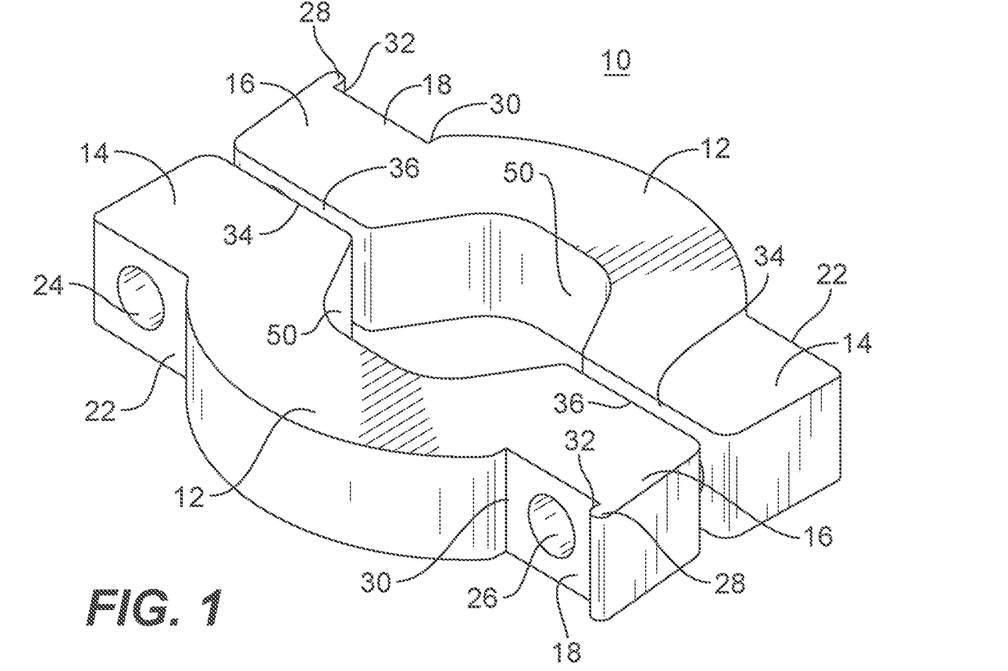
FIGS. 1 and 2 are perspective views of load bearing clamp according to an illustrative embodiment of the present disclosure.
Figure 2:
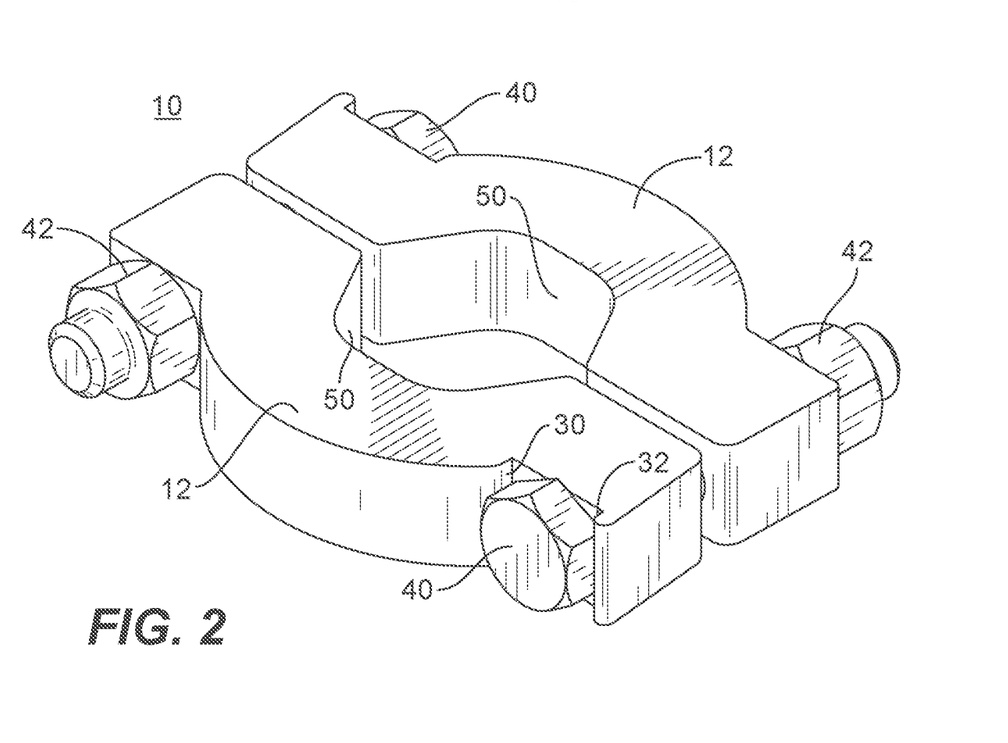
Figure 3:
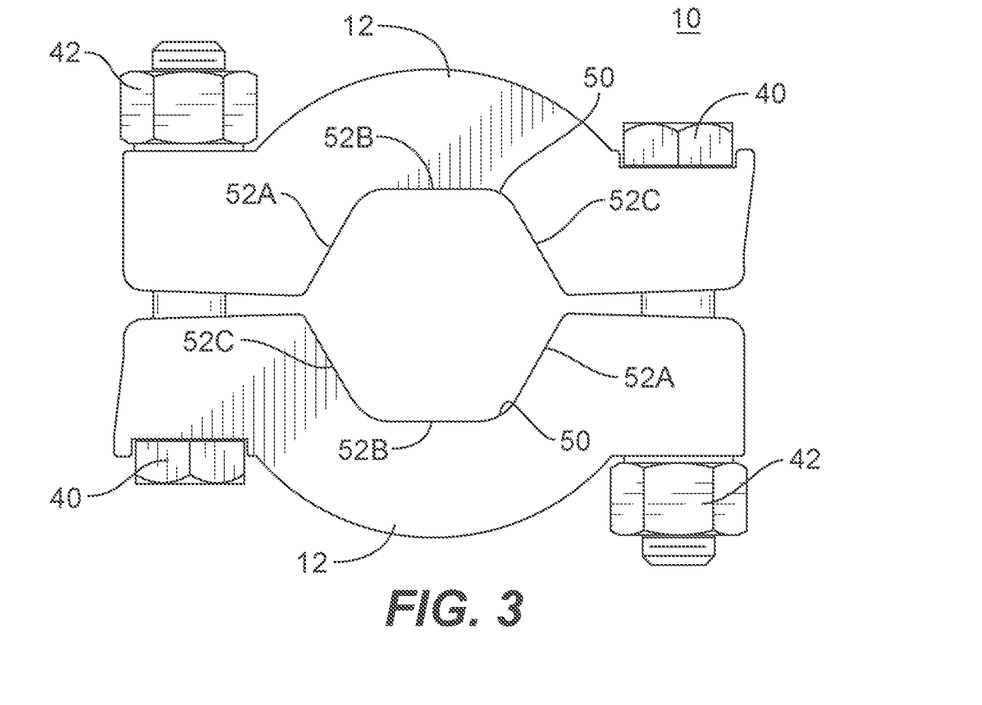
FIG. 3 is a plan view of a load bearing clamp according to an illustrative embodiment of the present disclosure.

A load bearing clamp according to an illustrative embodiment of the present disclosure is depicted in FIGS. 1 and 2 and is referred to generally as clamp 10. Clamp 10 includes two complementary semi-annular clamp members 12, having opposing surfaces 50. Each clamp member 12 includes a nut flange 14 and a bolt flange 16. According to an illustrative embodiment of the present disclosure, nut flange 14 includes a substantially flat surface 22 with an orifice 24 extending there through as shown. Bolt flange 16 includes a substantially flat surface 18 with an orifice 26 extending there through as shown. Bolt flange 16 has a lip 28 extending therefrom which has a bolt surface 32 which is substantially parallel with an opposing bolt surface 30. Nut flange 14 includes a surface 34 which is substantially parallel to opposing surface 36 of bolt flange 16. As shown in FIG. 2, hex head bolts 40 extend through orifices 26 and 24 in bolt flange 16 and nut flange 14, respectively, and receive threaded nuts 42. The distance between surfaces 30 and 32 on bolt flange 16 is dimensioned to receive the hex head of bolt 40 such that bolt 40 does not rotate as nut 42 is tightened. According to illustrative embodiments of the present disclosure, the inside opposing surfaces 50 of clamp members 12 are shaped to provide compressive forces to deform a shaft (e.g., a helical pile shaft) in contact therewith providing friction and mechanical connection to the shaft and transmitting axial loads to the shaft. FIG. 3 is a plan view of the illustrative embodiment of the clamp 10 shown in FIGS. 1 and 2. As shown most clearly in FIG. 3, opposing inner surfaces 50 of clamp members 12 each include three substantially flat surface areas 52A-52C. Together, the opposing surface areas 50 form a hexagonal shape as shown. Of course, depending on the number of flat surface areas provided, the opposing surfaces may form an octagon or other appropriate shape.

Figure 4:
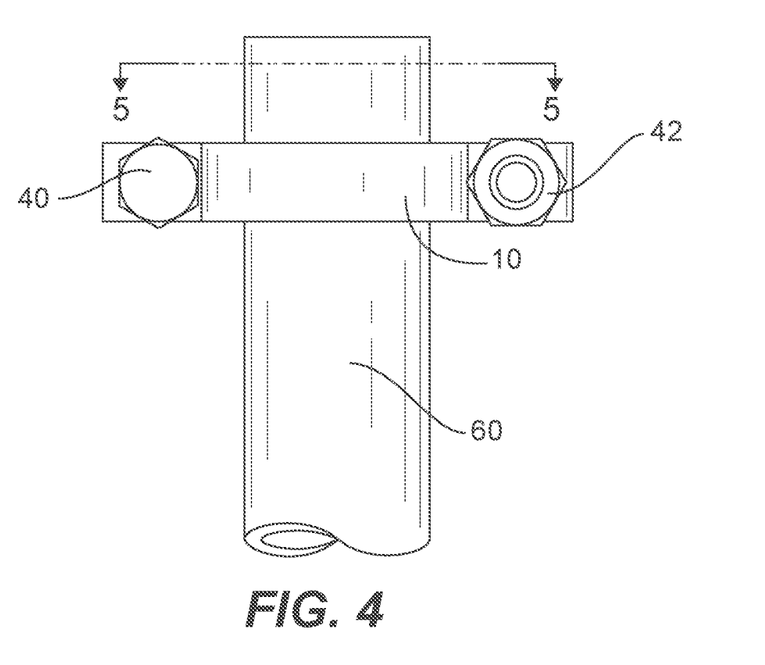
FIG. 4 is a view of a load bearing clamp according to an illustrative embodiment of the present disclosure attached to a shaft.
Figure 5:
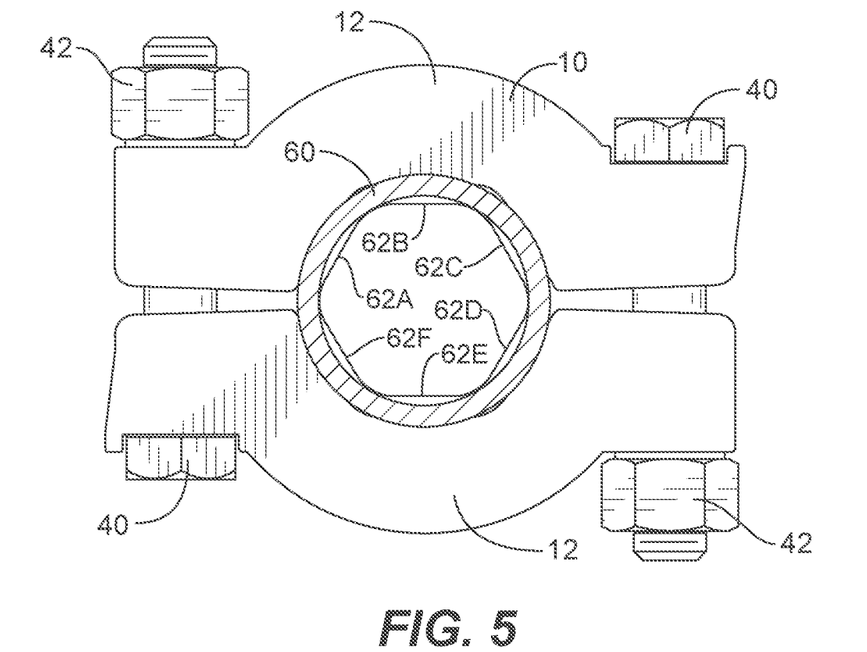
FIG. 5 is an end view taken along the lines 5-5 of FIG. 4.

FIG. 4 depicts a load bearing clamp 10 according to an illustrative embodiment of the present disclosure clamped to a pipe or pile shaft 60 for further describing aspects of the present disclosure. Nuts 42 and bolts 40 are initially loosened so that clamp 10 can be easily slid onto shaft 60. Once positioned on shaft 60, nuts 42 and bolts 40 on each side of clamp 10 are torqued down drawing the two halves of clamp 10 together. The nuts and bolts are tensioned such that the clamp 10 deforms or crimps shaft 60. FIG. 5 is a view taken along lines 5-5 of FIG. 4 and depicts how flat surface areas 52A-52C of clamp 10 deform or crimp the portions of shaft 60 in contact therewith. These deformed portions are shown as areas 62A-62F. The clamp 10 thus provides friction and mechanical connection to shaft 60 and will transfer tension and compression loads to the shaft 60.

Figure 6:
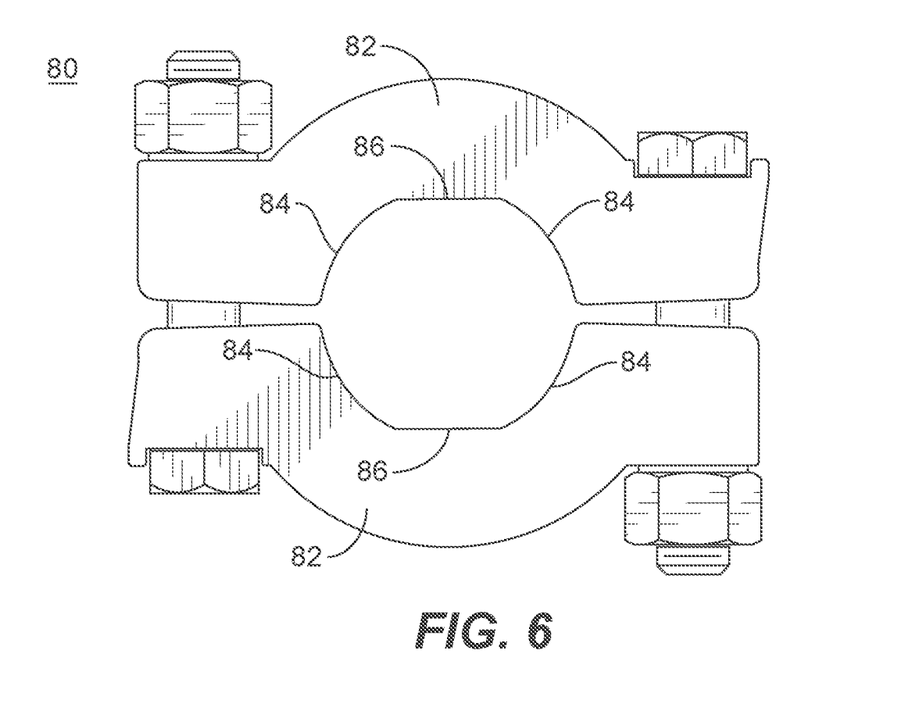
FIG. 6 is a plan view of a load bearing clamp according to an illustrative embodiment of the present disclosure.
Figure 7:
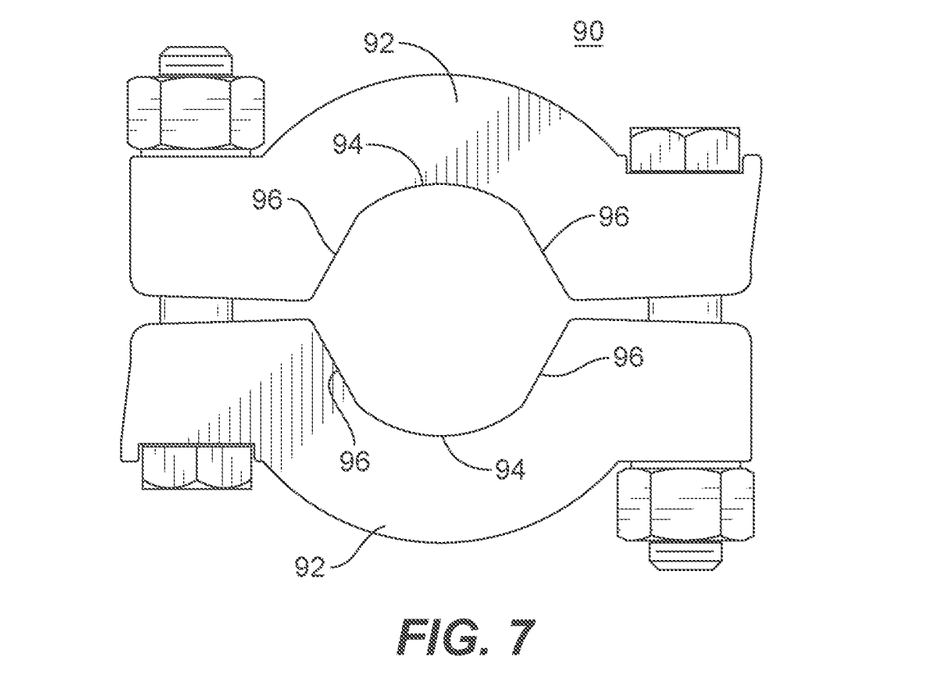
FIG. 7 is a plan view of a load bearing clamp according to an illustrative embodiment of the present disclosure.
Figure 8:
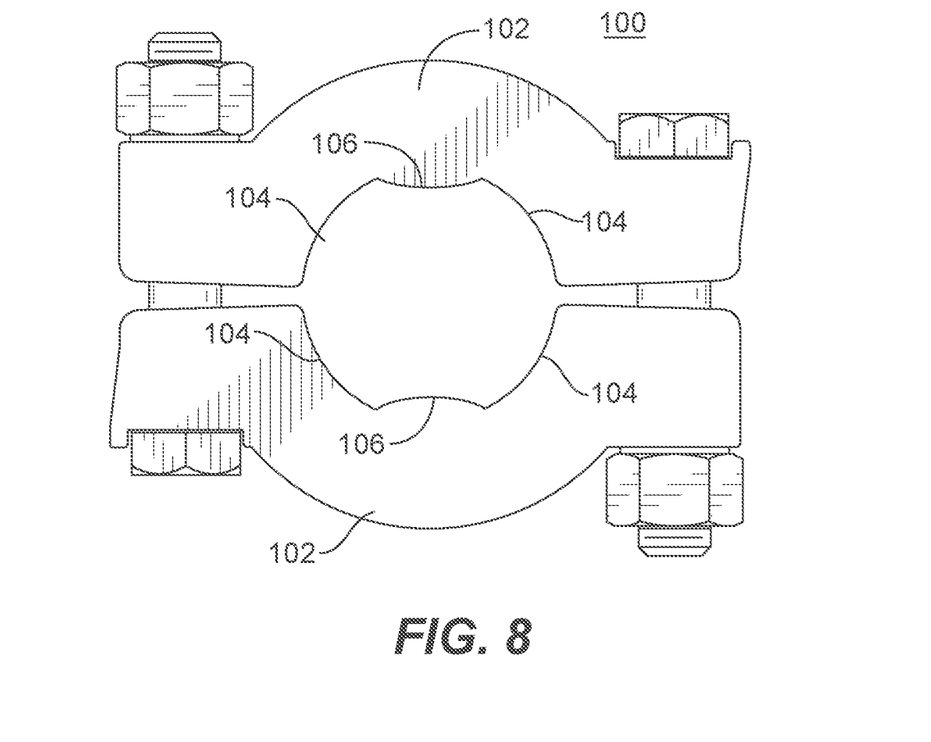
FIG. 8 is a plan view of a load bearing clamp according to an illustrative embodiment of the present disclosure.

FIGS. 6-8 depict clamps according to various other embodiments of the present disclosure. The clamps depicted in FIGS. 6-8 are substantially similar to that depicted in FIGS. 1-3 except for the shape of the inner surfaces that bear against the pipe or shaft being clamped. For example, according to an illustrative embodiment of the present disclosure as shown in FIG. 6, each clamp member 82 of clamp 80 has semi-circular inner surfaces 84 having one flat surface portion 86. During use, when clamp 80 is clamped to a pipe or shaft, the flat surface portions 86 will deform the pipe or shaft and secure the clamp 80 in position and transfer loads acting on the clamp 80 to the pipe or shaft.

According to an illustrative embodiment of the present disclosure shown in FIG. 7, each clamp member 92 of clamp 90 has a semi-circular inner surface 94 and two flat surface portions 96. During use, when clamp 90 is clamped to a pipe or shaft, the flat surface portions 96 will deform the pipe or shaft and secure the clamp 90 in position and transfer loads acting on the clamp 90 to the pipe or shaft.

According to another illustrative embodiment of the present disclosure as shown in FIG. 8, each clamp member 102 of clamp 100 has semi-circular inner surfaces 104 and a convex surface area 106. During use, when clamp 100 is clamped to a pipe or shaft, the convex surface areas 106 will deform the pipe or shaft and secure the clamp 100 in position and transfer loads acting on the clamp 100 to the pipe or shaft. Of course, other variations of the above-described illustrative embodiments are possible. For example, the semi-circular inner surface 104 of the clamp members 102 may have a combination of irregular surfaces including one or more flat and/or convex surfaces.

According to the above-described embodiments, the clamp members are drawn together utilizing nuts 42 and bolts 40. However, it will be appreciated that other types of attachment may be utilized. For example, as described with respect to the above embodiments, one flange on each end of a clamp member 12 may include a through hole 24 for a threaded bolt 40 to slide through. However, the opposing flange on the other clamp member 12, instead of having a through hole may instead have a threaded hole for receiving the threaded bolt 40. The clamp members can then be drawn together utilizing the bolts and not require use of nuts.

Figure 9:
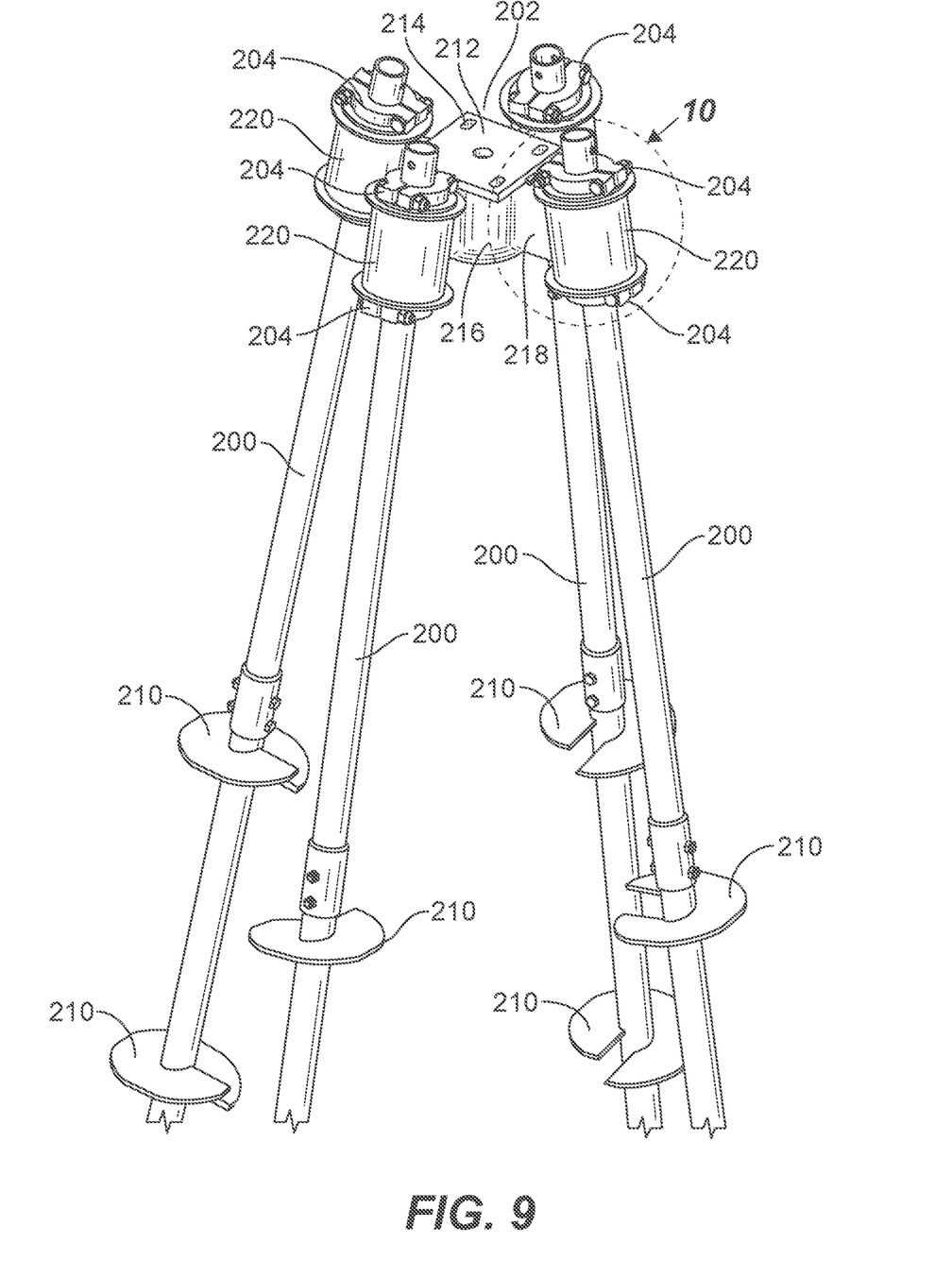
FIG. 9 is a perspective view of a grillage and helical pile assembly according to an embodiment of the present disclosure.

According to illustrative embodiments of the present disclosure, the load bearing clamps illustrated above may be utilized for attaching a structure to one or more helical shaft piles. The following described embodiments show grillage being attached to a plurality of helical shaft piles. However, it should be understood that the present disclosure is not limited to attaching grillage and that any suitable structure may be attached to the helical shaft piles as desired. According to an illustrative embodiment of the present disclosure as shown in FIG. 9, four pile shafts 200, each of which may include one or more sections each, are driven into the ground. The shafts 200 may be hollow or solid and may have any suitable cross-sectional shape including round, square, etc. Each shaft 200 has one or more spaced apart shear helical plates 210 arranged along the length of the shaft 200, as shown. The helical plates 210 may be welded to the shaft 200 or may be otherwise secured to the shaft 200 using any other suitable method. When shaft 200 is rotated, each of the one or more helical plates 210 will screw the shaft 200 into the soil with minimal disruption to the surrounding soil. Generally, each shaft 200 is screwed into the soil to an appropriate depth. Grillage 202 includes a top mounting plate 212 having one or more mounting holes 214 extending there through and a circular base member 216 from which four arms 218 extend. A tower or other structure may be mounted to the top mounting plate 212 utilizing mounting holes 214. Top mounting plate 212 and arms 218 may be welded to circular base member 216 or may be otherwise secured to the circular base member 216 using any suitable method. Tubular members 220 are welded to arms 218 or otherwise secured to the arms 218 using any suitable method, e.g., clamps 204. Tubular members 220 are open at the top and bottom. Load bearing clamps according to any one or more embodiments described above are secured to shaft 200 and are utilized to secure grillage 202 in position and to transfer axial loads to the shaft as will be described below.

Figures 10, 11:
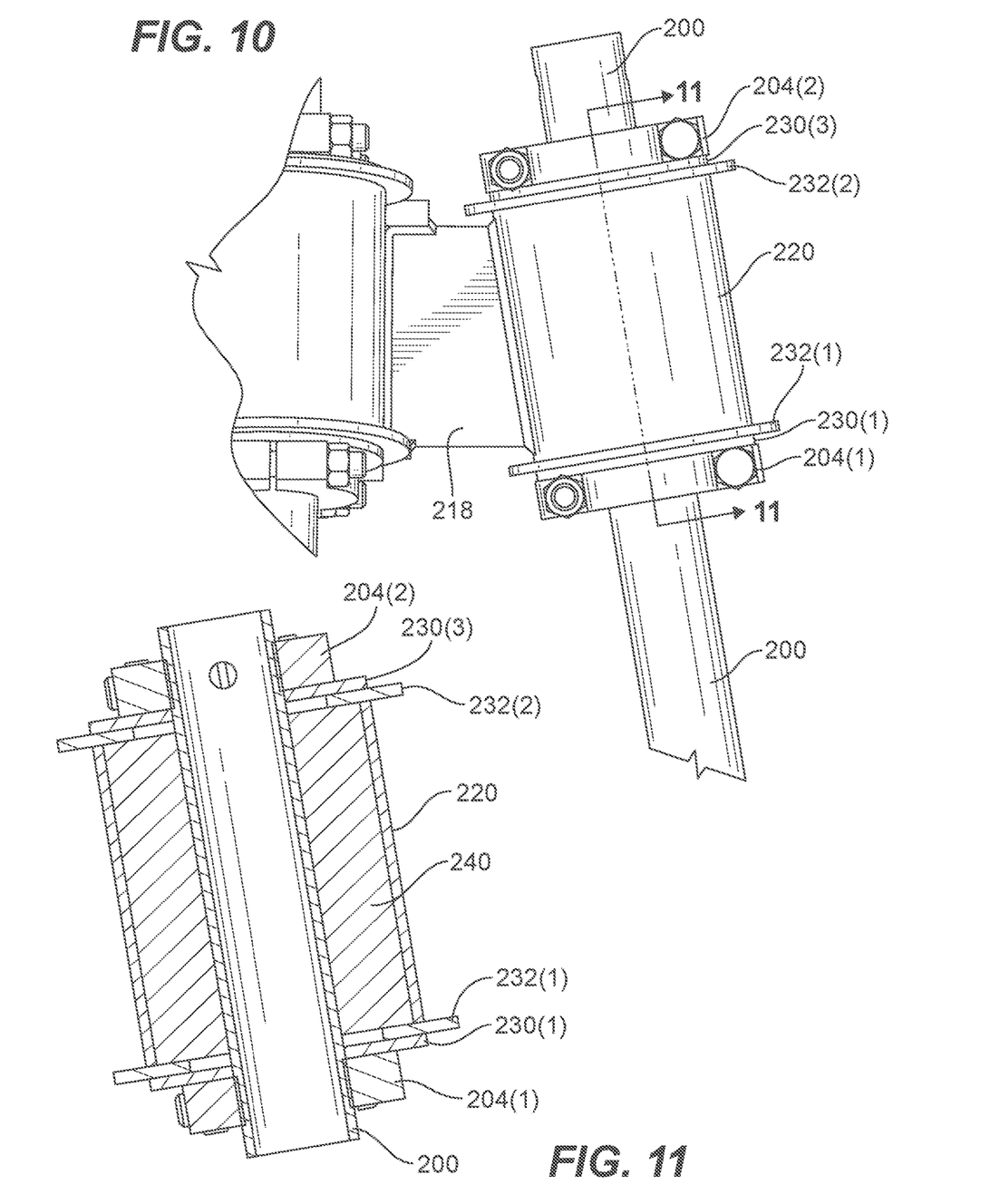
FIG. 10 is an enlarged view of a portion of the grillage and helical pile assembly depicted in FIG. 9.
FIG. 11 is cross-sectional view of a portion of the view depicted in FIG. 10 taken along the lines 11-11.

As shown most clearly in FIGS. 10 and 11, a clamp 204(1) according to one of the above described embodiments is secured to shaft 200. A first plate 230(1) rests on top of clamp 204(1). Plate 230(1) is essentially a large circular washer having a hole there through dimensioned to receive shaft 200. A relatively larger diameter plate 232(1) than plate 230(1) rests on plate 230(1). Plate 232(1) is also essentially a large circular washer. The diameter of plate 232(1) is larger than the diameter of tubular member 220. The hole through plate 232(1) has a diameter substantially larger than shaft 200 but smaller than the diameter of tubular member 220. Tubular member 220 rests on top of plate 232(1). Plate 232(1) is dimensioned such that even if shaft 200 does not align and extend through the exact center of tubular member 220, plate 232(1) can be adjusted accordingly to support tubular member 220. A filler such as, for example, grout 240 is provided in the cavity between shaft 200 and tubular member 220 and secures the shaft 200 and tubular member 220 preventing lateral movement. A plate 232(2) is provided on the top of tubular member 220 and a plate 230(3) rests on top of plate 232(2). Plates 230(2) and 232(3) seal the filler in the tubular member 220. A clamp 204(2) according to one of the above-described embodiments is secured above plate 230(3). Grillage 202 and plates 230, 232 may be made of steel, galvanized steel, stainless steel or any other suitable alloy of materials. Loads acting on the grillage are transferred to tubular members 220 via arms 218 and then to clamps 204. The loads are then effectively transferred to shaft 200.

Figures 12, 13:
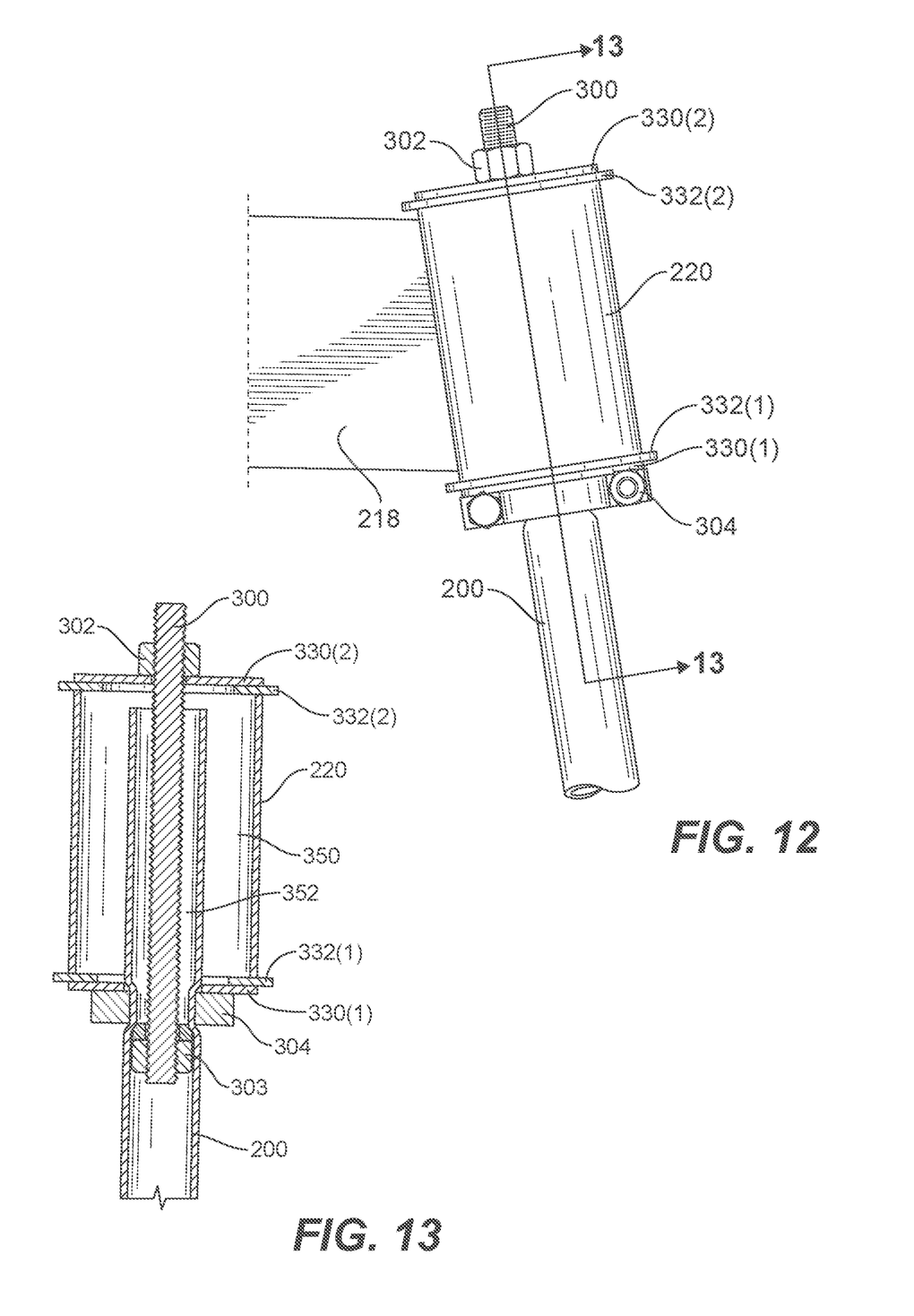
FIG. 12 is an enlarged view of a grillage and helical pile assembly according to another illustrative embodiment of the present disclosure.
FIG. 13 is a cross-sectional view of a portion of the view depicted in FIG. 12 taken along lines 13-13.

According to another illustrative embodiment of the present disclosure as shown in FIGS. 12 and 13, the grillage 202 may be attached to a shaft 200 utilizing a threaded rod 300. A clamp 304 according to one of the above described embodiments is secured to shaft 200. A first plate 330(1) rests on top of clamp 304. Plate 330(1) is essentially a large circular washer having a hole there through dimensioned to receive shaft 200. A relatively larger diameter plate 332(1) than plate 230(1) rests on plate 330(1). Plate 332(1) is also essentially a large circular washer. The diameter of plate 332(1) is larger than the diameter of tubular member 220. The hole through plate 332(1) has a diameter substantially larger than shaft 200 but smaller than the diameter of tubular member 220. Plate 332(1) is thus dimensioned such that even if shaft 200 does not align and extend through the exact center of tubular member 220, plate 332(1) can be adjusted accordingly to support tubular member 220. As shown most clearly in FIG. 13, a threaded rod 300 is positioned in shaft 200. Threaded rod 300 has a nut 303 threaded thereon and is positioned prior to clamp 304 being secured to shaft 200. In this way, when clamp 304 is then secured to and deforms shaft 200, threaded rod 300 and nut 303 are secured in position. According to another embodiment of the present disclosure, threaded rod 300 may be replaced with a large bolt with the head of the bolt extending into shaft 200. A plate 332(2) is provided on the top of tubular member 220 and a plate 330(3) rests on top of plate 332(2). A filler such as, for example, grout may be provided in the cavity 350 between shaft 200 and tubular member 220 and in the cavity 352 between threaded rod 300 and shaft 200 preventing lateral movement of the parts. Plates 330(2) and 332(2) seal the filler in the tubular member 220 and shaft 200. A nut 302 is threaded to threaded rod 300 and secures the plates 330(2) and 332(2) in position. Threaded rod 300 and nuts 302, 304, plates 330, 332, etc. may be made from steel, galvanized steel, stainless steel or any other suitable alloy of materials.

The load bearing clamps as described herein effectively transfer axial loads to structures to which they are attached. Utilizing load bearing clamps as described herein, structures can be more effectively and efficiently erected in remote locations. The grillage as described herein complements the load bearing clamps described herein providing a secure base for structures erected in remote locations. The load bearing clamps and grillage as described herein are particularly suited to the constructions of remote structures utilizing helical pile shafts. The particular configuration of the load bearing clamps, grillage, plates (washers), etc. as well as the diameters of each may depend upon the particular piles being utilized which will generally depend on the load the piles are to bear, and the soil conditions. Accordingly, it will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the disclosure as defined by the claims appended hereto.

What is claimed is:

1. A pile assembly comprising:
   a helical pile having a shaft; and
   at least one load bearing clamp, each load bearing clamp including:
   a first clamp member having a plurality of shaft clamping surfaces, each shaft clamping surface of the first clamp member may have the same shape or a different shape;
   a second clamp member having a plurality of shaft clamping surfaces, each shaft clamping surface of the second clamp member may have the same shape or a different shape; and
   at least one member for drawing the first clamp member and the second clamp member toward each other so that the plurality of shaft clamping surfaces of the first clamp member and the plurality of shaft clamping surfaces of the second clamp member oppose each other and are drawn toward each other, wherein when the shaft is positioned between the plurality of shaft clamping surfaces of the first clamp member and the plurality of shaft clamping surfaces of the second clamp member and the at least one member draws the first clamp member and the second clamp member toward each other so that the plurality of shaft clamping surfaces of the first clamp member and the plurality of shaft clamping surfaces of the second clamp member apply a compressive force on the shaft sufficient to deform the shaft and provide a mechanical connection of the load bearing clamp to the shaft.

2. The load bearing clamp according to claim 1, wherein the shape of the plurality of shaft clamping surfaces of the first clamp member comprises at least one flat surface, and wherein the shape of the plurality of shaft clamping surfaces of the second clamp member comprises at least one flat surface.

3. The load bearing clamp according to claim 1, wherein the shape of the plurality of shaft clamping surfaces of the first clamp member comprises at least one convex surface, and wherein the shape of the plurality of shaft clamping surfaces of the second clamp member comprises at least one convex surface.

4. The load bearing clamp according to claim 1, wherein the shape of the plurality of shaft clamping surfaces of the first clamp member includes at least one flat surface and at least one convex surface, and wherein the shape of the plurality of shaft clamping surfaces of the second clamp member includes at least one flat surface and at least one convex surface.

5. The load bearing clamp according to claim 1, wherein the first clamp member includes first and second flange members each having an orifice, and the second clamp member includes third and fourth flange members each having an orifice, and wherein the at least one member for drawing the first clamp member and the second clamp member toward each other comprises at least one nut and bolt extending through the orifice in the first flange member and the orifice in the third flange member.

6. The load bearing clamp according to claim 1, wherein the shape of the plurality of shaft clamping surfaces of the first clamp member includes at least one flat surface and at least one arcuate surface, and wherein the shape of the plurality of shaft clamping surfaces of the second clamp member includes at least one flat surface and at least one arcuate surface.

7. The load bearing clamp according to claim 1, wherein the shape of the plurality of shaft clamping surfaces of the first clamp member includes at least one convex surface and at least one arcuate surface, and wherein the shape of the plurality of shaft clamping surfaces of the second clamp member includes at least one convex surface and at least one arcuate surface.

8. A pile assembly comprising:
   a helical pile having a shaft; and
   at least one load bearing clamp, each load bearing clamp including:
   two clamping members, each clamping member having a plurality of shaft clamping surfaces, each shaft clamping surface of each clamping member may have the same shape or a different shape; and
   a pair of fastening members for drawing the clamping members toward each other so that the plurality of shaft clamping surfaces of each clamping member oppose each other and are drawn toward each other, wherein when the shaft is positioned between the plurality of shaft clamping surfaces of the clamping members and the pair of fastening members draw the clamping members toward each other so that the plurality of shaft clamping surfaces of the clamping members apply a compressive force on the shaft deforming the shaft sufficient to secure the load bearing clamp in position on the shaft and sufficient to transfer loads acting on the clamp to the shaft.

9. The load bearing clamp according to claim 8, wherein at least one of the plurality of shaft clamping surfaces on each clamping member includes at least one flat surface.

10. The load bearing clamp according to claim 8, wherein at least one of the plurality of shaft clamping surfaces on each clamping member includes at least one convex surface.

11. The load bearing clamp according to claim 8, wherein at least one of the plurality of shaft clamping surfaces on each clamping member includes at least one arcuate surface.

12. The load bearing clamp according to claim 8, wherein at least one of the plurality of shaft clamping surfaces on each clamping member includes at least one flat surface and at least one convex surface.

13. The load bearing clamp according to claim 8, wherein at least one of the plurality of shaft clamping surfaces on each clamping member includes at least one flat surface and at least one arcuate surface.

14. The load bearing clamp according to claim 8, wherein at least one of the plurality of shaft clamping surfaces on each clamping member includes at least one convex surface and at least one arcuate surface.

15. The load bearing clamp according to claim 8, wherein each clamping member includes a pair of flange members, each flange member having an orifice therethrough.

16. The load bearing clamp according to claim 15, wherein each fastening member comprises a nut and bolt, and the bolt is passed through an orifice in one of the pair of flange members in one clamp member and through an orifice in one of the pair of flange members in the other clamp member and the nut is attached to the bolt.

17. A pile assembly comprising:
    a helical pile having a shaft; and
    at least one load bearing clamp, each load bearing clamp including:
    a first clamp member having a pair of flanges and a plurality of shaft clamping surfaces between the pair of flanges, each flange in the pair of flanges having an orifice therethrough, each shaft clamping surface of the first clamp member may have the same shape or a different shape;

a second clamp member having a pair of flanges and a plurality of shaft clamping surfaces between the pair of flanges, each flange in the pair of flanges having an orifice therethrough, each shaft clamping surface of the second clamp member may have the same shape or a different shape; and a first fastening member positioned within the orifice in one flange of the first clamp member and within the orifice in one flange of the second clamp member;

a second fastening member positioned within the orifice in the other flange of the first clamp member and within the orifice in the other flange of the second clamp member; and wherein when the shaft is positioned between the plurality of shaft clamping surfaces of the first clamp member and the plurality of shaft clamping surfaces of the second clamp member and the first and second fastening members are tightened to draw the first clamp member and the second clamp member toward each other so that the plurality of shaft clamping surfaces of the first clamp member and the plurality of shaft clamping surfaces of the second clamp member apply a compressive force on the shaft deforming the shaft sufficient to secure the load bearing clamp in position on the shaft and sufficient to transfer loads acting on the clamp to the shaft.

18. The load bearing clamp according to claim 17, wherein the shape of the plurality of shaft clamping surfaces of the first clamp member include at least one flat surface, and wherein the shape of the plurality of shaft clamping surfaces of the second clamp member include at least one flat surface.

19. The load bearing clamp according to claim 17, wherein the shape of the plurality of shaft clamping surfaces of the first clamp member include at least one convex surface, and wherein the shape of the plurality of shaft clamping surfaces of the second clamp member include at least one convex surface.

20. The load bearing clamp according to claim 17, wherein the shape of the plurality of shaft clamping surfaces of the first clamp member include at least one arcuate surface, and wherein the shape of the plurality of shaft clamping surfaces of the second clamp member include at least one arcuate surface.

21. The load bearing clamp according to claim 17, wherein the shape of the plurality of shaft clamping surfaces of the first clamp member include at least one flat surface and at least one convex surface, and wherein the shape of the plurality of shaft clamping surfaces of the second clamp member include at least one flat surface and at least one convex surface.

22. The load bearing clamp according to claim 17, wherein the shape of the plurality of shaft clamping surfaces of the first clamp member include at least one flat surface and at least one arcuate surface, and wherein the shape of the plurality of shaft clamping surfaces of the second clamp member include at least one flat surface and at least one arcuate surface.

23. The load bearing clamp according to claim 17, wherein the shape of the plurality of shaft clamping surfaces of the first clamp member includes at least one convex surface and at least one arcuate surface, and wherein the shape of the plurality of shaft clamping surfaces of the second clamp member includes at least one convex surface and at least one arcuate surface.

24. The load bearing clamp according to claim 17, wherein the first fastening member comprises a nut and bolt, and the second fastening member comprises a nut and bolt.

\* \* \* \* \*